US007822662B2

United States Patent
Guzik et al.

(10) Patent No.: US 7,822,662 B2
(45) Date of Patent: Oct. 26, 2010

(54) KEY PERFORMANCE INDICATOR SYSTEM AND METHOD

(75) Inventors: Grzegorz Guzik, Redmond, WA (US); Amir Netz, Bellevue, WA (US); Marin Bezic, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1142 days.

(21) Appl. No.: 10/811,654

(22) Filed: Mar. 29, 2004

(65) Prior Publication Data

US 2005/0216831 A1 Sep. 29, 2005

(51) Int. Cl.
*G06Q 40/00* (2006.01)
(52) U.S. Cl. .......................... 705/35; 705/37
(58) Field of Classification Search ............ 705/35, 705/37
See application file for complete search history.

(56) References Cited

U.S. PATENT DOCUMENTS

| 5,485,574 | A | 1/1996 | Bolosky et al. |
| 6,718,535 | B1 * | 4/2004 | Underwood ............... 717/101 |
| 6,735,630 | B1 * | 5/2004 | Gelvin et al. ............. 709/224 |
| 6,738,955 | B2 | 5/2004 | Andersen et al. |
| 6,748,555 | B1 | 6/2004 | Teegan et al. |
| 7,076,763 | B1 * | 7/2006 | DeGroote et al. .......... 717/112 |
| 2002/0099579 | A1 * | 7/2002 | Stowell et al. .............. 705/7 |
| 2003/0110249 | A1 * | 6/2003 | Buus et al. ................ 709/224 |
| 2003/0154144 | A1 * | 8/2003 | Pokorny et al. ............ 705/28 |
| 2006/0294098 | A1 * | 12/2006 | Thomson et al. ........... 707/6 |
| 2008/0319829 | A1 * | 12/2008 | Hunt et al. ................ 705/10 |

OTHER PUBLICATIONS

Norman E. Fenton and Martin Neil. Software Metrics: Roadmap. Proceedings of the Conference on the Future of Software Engineering, pp. 357-370, 2000.
M. Ben-Menachem and R. Gelbard. Integrated IT Management Tool Kit. Communications of the ACM, vol. 45 Issue 4, pp. 96-102, 2002.
Sandeep Purao and Vijay Vaishnavi. Product Metrics for Object-Oriented Systems. ACM Computing Surveys, vol. 35 Issue 2, pp. 191-221, 2003.

* cited by examiner

*Primary Examiner*—Ella Colbert
*Assistant Examiner*—John A Anderson
(74) *Attorney, Agent, or Firm*—Workman Nydegger (57) ABSTRACT

The present invention relates to a system and methodology associated with providing a flexible unified view of key performance indicators (KPIs). Retrieving KPI values from a store is not always trivial and may require submitting multiple queries to in order to obtain desired results. The present system and method makes it easier for front-end applications to access and display KPIs in an easily customizable form. Furthermore, third parties can leverage off the provided architecture in connection with their own applications to facilitate quick and easy access to a single view of performance indicators.

25 Claims, 10 Drawing Sheets

KEY PERFORMANCE INDICATOR SYSTEM AND METHOD

TECHNICAL FIELD

The present invention relates generally to computers and more particularly toward a key performance indicator architecture and method of use.

BACKGROUND

Computers and other related technology pervade modern business enterprises as well as other organizations. Businesses utilize computers to improve the productivity of their employees and manage operations. Today businesses rely on a plurality of performance data derived from enterprise resource planning (ERP) software, customer relationship management (CRM) software as well as spreadsheets and other data files. Unfortunately, each system defines and presents data in a different manner. Moreover, each system provides information on different aspects of a business operation. Hence, business professionals must expend a large amount of time and energy to consolidate and digest great quantities of data to determine what is important to its business and its future goals. Key performance indicators can facilitate providing a business decision maker with a consolidated understanding of company performance. This allows executives and decision makers to keep track of the pulse of business and act quickly to take advantage of opportunities to propel business forward toward established goals and objectives Key performance indicators (KPIs) are customizable business metrics utilized to visualize status and trends in an organization. Once a business or other organization defines its mission or objectives, KPIs can be employed to measure progress toward those objectives. In general, each KPI can have a target value and an actual value. The target value represents a quantitative goal or object that is considered key or critical to the success of a business or organization. Thus target values can be quite different for distinct businesses as their goals and focus are often dissimilar. For example, business can have KPIs concerning sales, net profit, and debt ratio, while a school may define a KPI related to graduation rate. Of course, the target value can change over time but is for the most part a stable value. The actual value is the value that fluctuates often based on the actions and performance of a business. Actual values can be compared to target values to determine a business' health or progress toward the target value. Thus KPIs are advantageous in that they provide a clear description of organizational goals and distill vast quantities of data down to a single value that can be utilized to continuously monitor business performance and its progress toward organization benchmarks. However, it should be noted that KPIs can be helpful in organization management as long as the KPIs reflect critical success factors and the KPIs can be measured consistently with accuracy.

KPIs and scorecards (groups of KPIs) are not a novel business concept. Business decision makers have been utilizing KPIs for some time now to measure the health of their business. However, problems with KPIs have been identified in practice. In particular, different decision makers at different levels have been known to identify different key performance indicators. Thus, there has been inconsistency in the definition of organizational goals and objectives and hence key performance indicators. Additionally, even when decision makers agree upon a particular KPI, each decision maker could and often would calculate the KPI differently. Furthermore, conventional architectures are inefficient in that each decision maker identifies and defines KPIs as well as submits multiple queries to databases to retrieve the desired result. As a consequence, this also restricts the type of device that can receive KPIs, namely to larger computers (e.g., desktop, laptop, server . . . ) with the ability to query databases. Accordingly, there is a need in the art for a centralized KPI system that provides a flexible and unified view of key performance metrics that can be easily accessed from a plurality of computing devices.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a novel key performance indicator system and method. In particular, the subject system enables a client device to transmit information regarding KPIs of interest to a processing component. The processing component can then generate a KPI document that provides a list of KPIs to be retrieved as well other information. According to an aspect of the present invention, one or more data stores can be queried hence the KPI document can also comprise data store connection information. Upon receipt of a KPI document the processor component can utilize data provided by the KPI document to execute queries on one or more data stores. Retrieved query results can then be incorporated into a result document and transmitted to the client device or application.

According to one aspect of the subject invention, the processor component can be remotely located from the client device. Thus, the client device need only identify KPIs of interest and leave the processing of queries to another system, such as a server or intermediate computer. This allows devices of limited processing power such as mobile phones, pagers, personal digital assists (PDAs), and smart watches to request and receive KPI data. Furthermore, process efficiency is increased by allowing servers, for example, to execute queries independent from client devices.

According to another aspect of the invention the client device can generate a KPI document and transmit it to a process component. A graphical user interface can be utilized by a user to generate a KPI document and pass such document to the process component rather than forcing the process component to generate such document.

Furthermore, the processor component can employ the KPI document to retrieve query expressions according to yet another aspect of the subject invention. The query expressions can be retrieved from a data store prior to query. Thereafter, the processor component can execute the expressions on one or more data stores to retrieve metric data. However, it should be appreciated that the data stores can contain KPI definitions such that a query component need only reference such stored KPIs. The data store can then map to a KPI definition and execute the proper queries and calculations.

In brief the subject invention provides for a consistent view of KPIs and associated metrics and also makes it much easier for front-end client applications to access and display KPIs in an easily customizable form.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

The foregoing and other aspects of the invention will become apparent from the following detailed description and the appended drawings described in brief hereinafter.

DETAILED DESCRIPTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. For example, a computer readable media can include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope or spirit of the subject invention.

Figure 1:
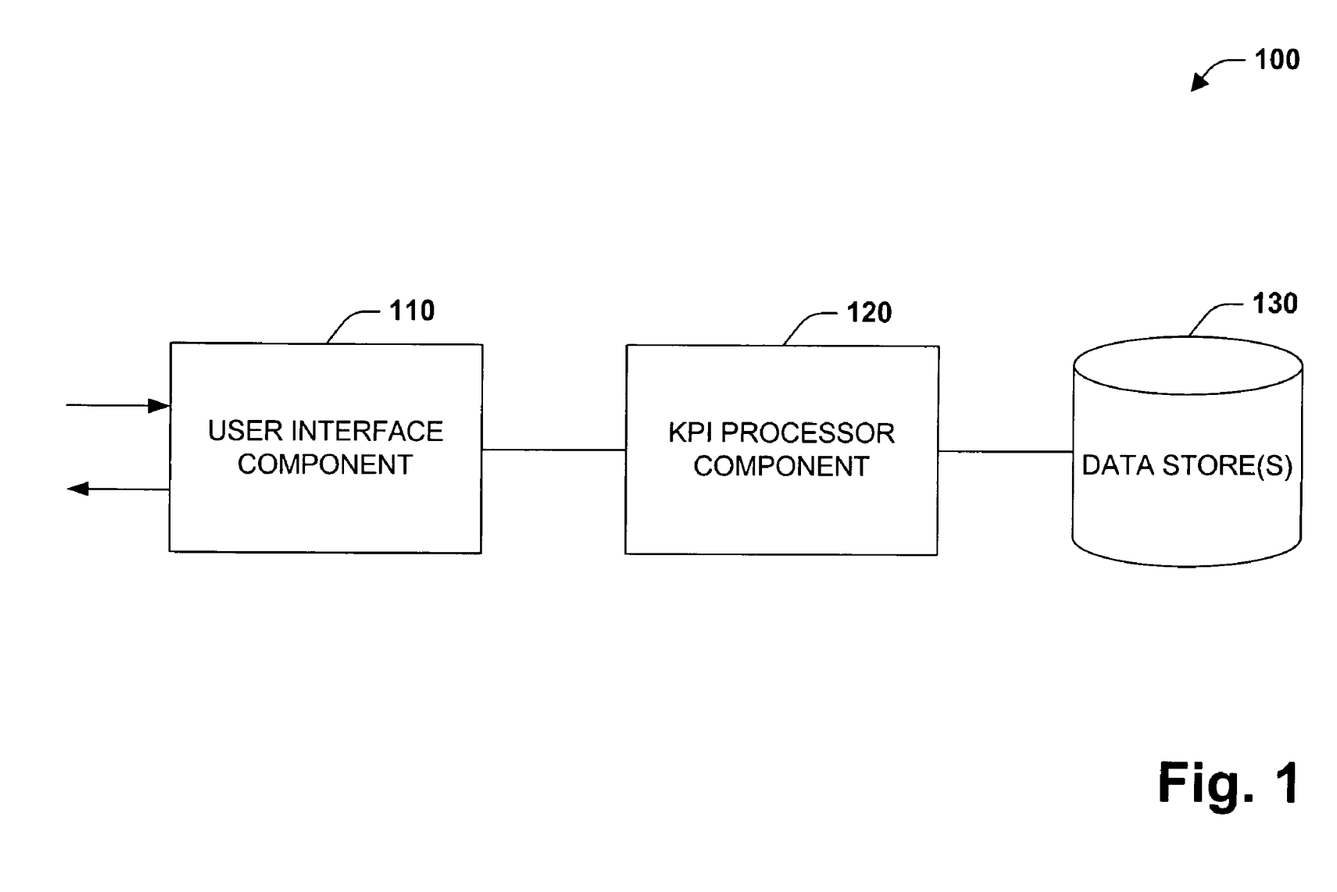
FIG. 1 is a schematic block diagram of a key performance indicator system in accordance with an aspect of the subject invention.

Turning to FIG. 1, a key performance indicator system 100 is illustrated in accordance with an aspect of the subject invention. The system 100 comprises user interface component 110, KPI processor component 120, and one or more data stores 130. User interface component 110 provides a mechanism to receive input from a user regarding a particular KPI or set of KPIs (also referred to as a scorecard) that the user desires to view. The user interface component 110 is also adapted to receive data regarding requested KPIs and display such data to the user. Input can correspond to selecting or providing a name of one or more KPIs. Alternatively, input can correspond to generation or receipt of a KPI document (as described in further detail in the following sections). Display of data can comprise presenting text and/or graphics relating to the values of the requested KPIs. KPI processor component 120 is adapted to receive and/or retrieve input from the user interface component 110. Upon receipt, such input is analyzed to determine its form and transformed into an alternative form if necessary. The alternative form can be a KPI document describing one or more KPI values to retrieve from one or more data sources 130. According, to one aspect of the subject invention the KPI document can be specified in a mark up language such as XML (Extensible Markup Language). However, alternative formats are also contemplated and considered within the scope of the present invention. Upon generation or receipt of a KPI document, the KPI processor component 120 can utilize such information provided within the document to ultimately execute a query or series of queries on one or more data stores 130 to retrieve the desired information. Data store(s) 130 can be one or more of a multitude of databases of the same or varying types located proximate to or remotely from one another. According to an aspect of the invention, data store 130 can be one of a relational database or a multidimensional on-line analytical processing (OLAP) database. For example, key performance indicator data concerning company profit could be housed in a relational database, while key performance indicator data regarding growth could be stored in a multidimensional OLAP database. Of course, the present invention is not limited solely to relational and multidimensional databases. While both the user interface component 110 and the KPI processor component 120 can be executed by the same computer, according to another aspect of the invention such components can be located remote from one another on different machines. Accordingly, user interface component 110 can be executed on a client device including but not limited to a mobile phone, a personal digital assistant (PDA), a hybrid mobile phone PDA, a pager, a smart watch, and a computer, while the KPI processor component 120 is executed on a computer or server. For remotely situated and executed user interface and processor components 110 and 120, the present invention contemplates both wired communication (e.g., via twisted pair, coaxial cable, optical fiber, power lines . . . ) and wireless communication (e.g., radio, infrared, microwave, satellite, Bluetooth . . . ) utilizing one or more of a local area network (LAN), a metropolitan area network (MAN), and a wide area network (WAN), such as the Internet. Furthermore, it should be appreciated that the one or more data stores 130 can be situated together on the same server or computer with the KPI processor component 120 and/or user interface 110. Remotely situated data stores 130 can also be accessed utilized wired or wireless communication over one or more of a LAN, MAN, or WAN.

Figure 2:
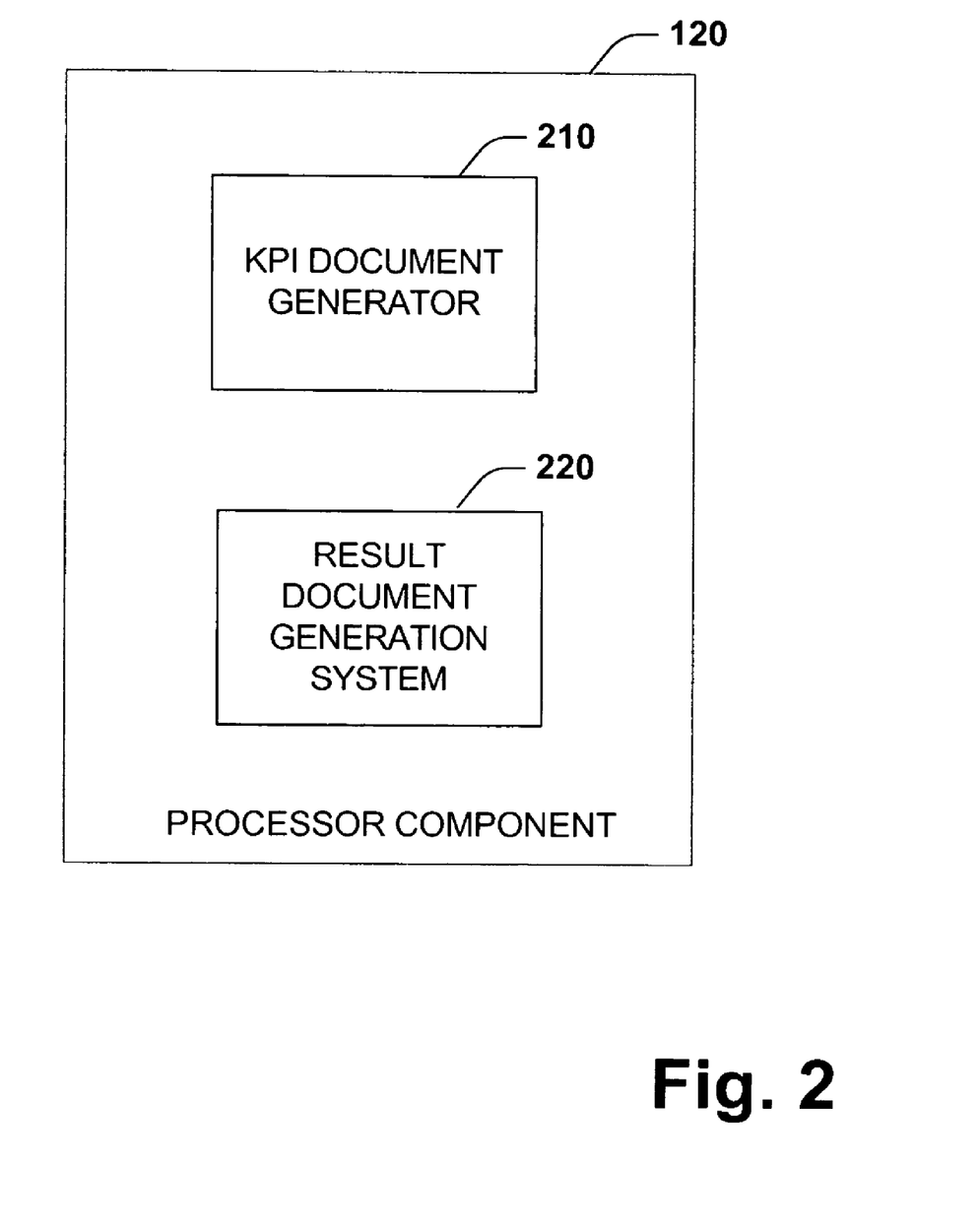
FIG. 2 is a schematic block diagram of a KPI processor component in accordance with an aspect of the subject invention.

Turning to FIG. 2, a KPI processor component 120 is illustrated in further detail in accordance with an aspect of the subject invention. KPI processor component 120 can comprise a KPI document generator component 210 and/or a result document generation system 220. KPI document generator component 210 transforms user provide KPI designations into an intermediate format, the KPI document, which can be utilized by the KPI processor component 120 to facilitate querying one or more data stores 130 (FIG. 1). The KPI document as described in further detail, supra, can include information regarding connections to data stores, KPIs, and KPI graphics. According to one aspect of the present invention the KPI document can be encoded utilizing XML. Result document generation system 220 produces a result document comprising requested KPI values and graphics, for example. The result document is generated by the result document generation system 220 concurrently with querying or upon completion of all queries as designated in the KPI document. The completely generated result document can then be transmitted back to the user interface component 110 (FIG. 1) for display. According to particular aspect of the subject invention, the result document can be an XML file. Hence, upon receipt of the result document the XML file can be displayed utilizing XSL (eXtensible Style sheet Language), for instance.

Figure 3:
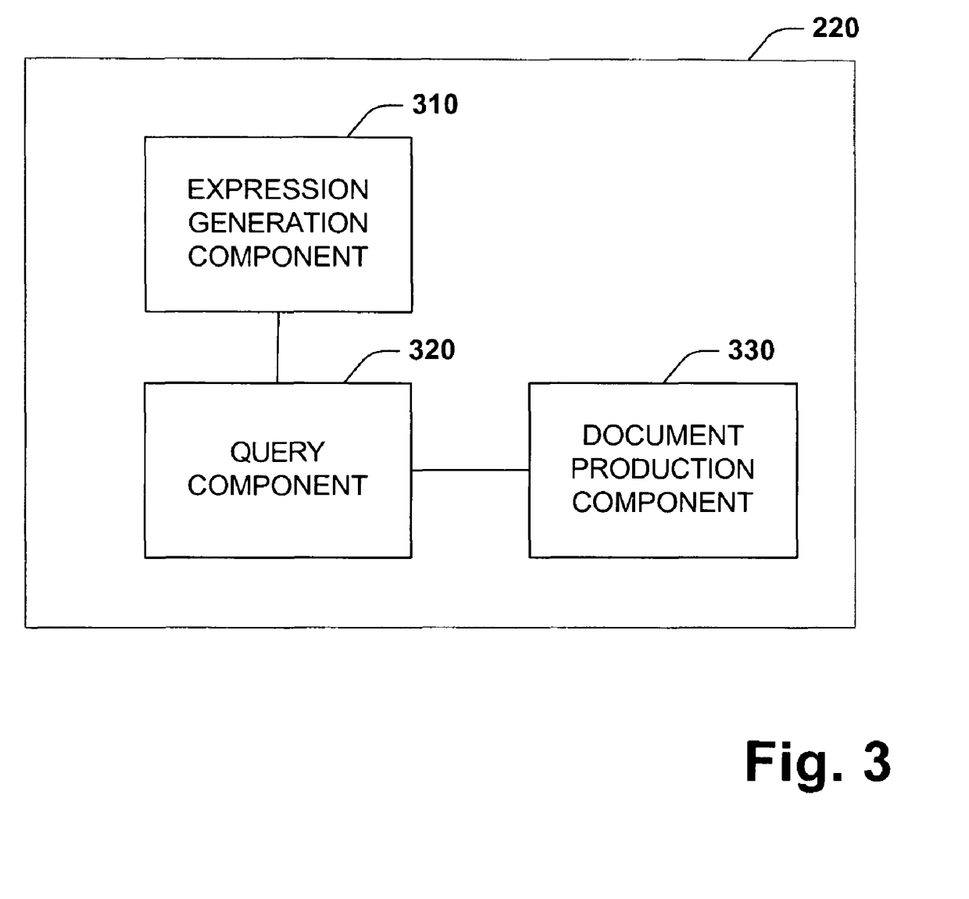
FIG. 3 is a schematic block diagram of a result document generation system in accordance with an aspect of the present invention.

FIG. 3 depicts a result document generation system 220 in accordance with an aspect of the present invention. Result document generation system 220 comprises an expression generation component 310, a query component 320, and a document production component 330. Expression generation component 310 provides the expressions that can be executed by the query component 320 to retrieve KPI values or metrics from on or more data stores. Expression generation component 310 can retrieve information provided in a KPI document such as the database name, the connection string, and the KPI name, and provide it to a database management system or server associated with a particular database that is to be queried. The server can then provide the expression that can be executed on the database to retrieve information therefrom such as a KPI value. Such expressions can then be provided to the query component, which can subsequently execute the expressions on one or more databases, for example, and retrieve KPI values and other associated data. It should be appreciated that according to an alternative aspect of the subject invention the server, database management system, or database can house information concerning how to generate KPI values and other associated data. Accordingly, the expression generation component 310 can be eliminated and the query component can simply ask for KPI information by name from a database. Query component 320 can transmit retrieved query data to document production component 330 to facilitated generation of a result document. The document production component 330 receives or retrieves query result data from query component 320 and generates a result document that can be transmitted back to the user interface component 110 (FIG. 1) for presentation and display to a user. According to one aspect of the subject invention, the result document can be specified in XML and displayed to a user utilizing the XSL family of document transformation and presentation (e.g., utilizing tables, nested folders, graphical indicators . . . ).

Figure 4:
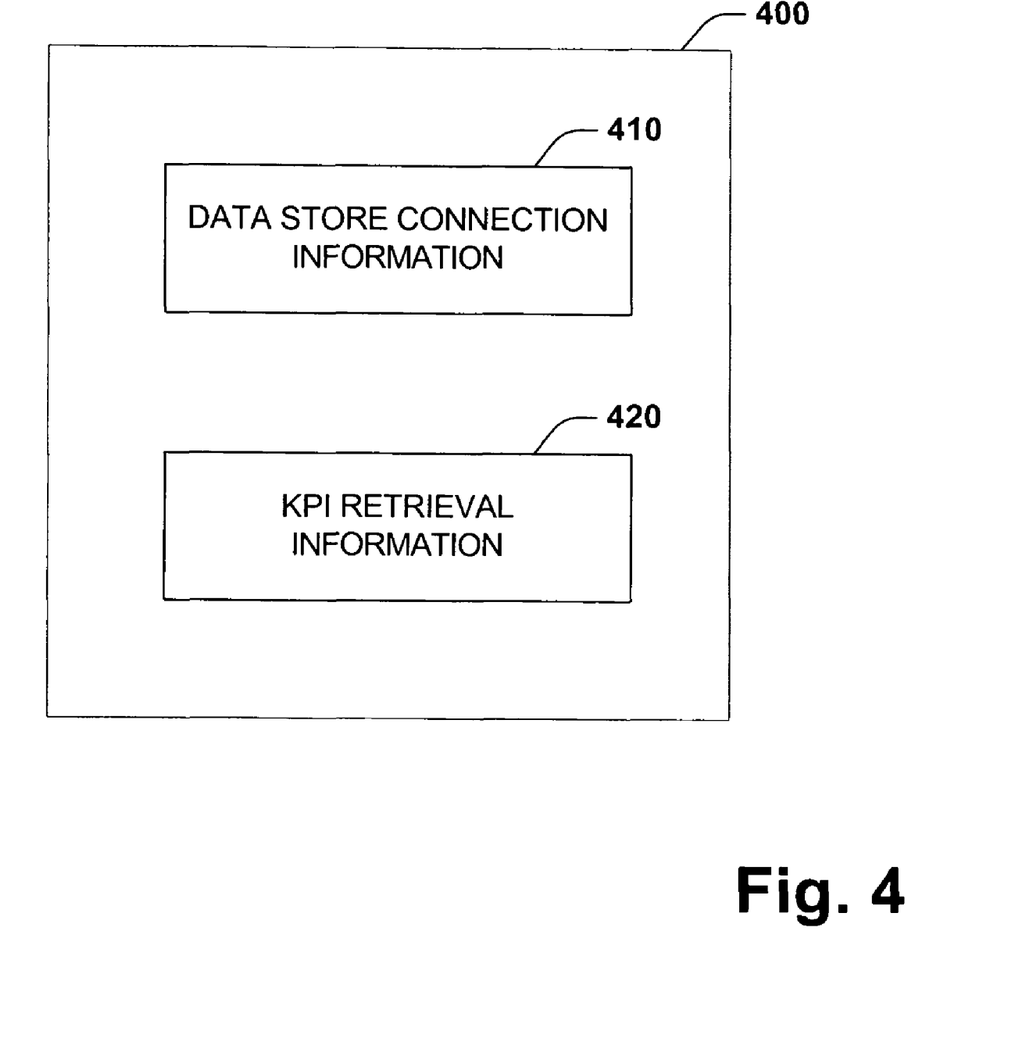
FIG. 4 is a schematic block diagram of a KPI document component in accordance with an aspect of the subject invention.

FIG. 4 illustrates a schematic block diagram of a KPI document component 400 in accordance with an aspect of the subject invention. Recall, KPI document component 400 can be generated from user input describing KPI values and other data to be utilized by the KPI processor component 120 (FIG. 1) to query one or more data stores or alternatively be provided as input from an interface component. KPI document component 400 comprises data store connection information 410 and KPI retrieval information 420. Data store connection information can include but is not limited to the name of the server, the name of the connection path, and the name of the database. For example:

```
<Kpi>
    <Server>localhost</Server>
    <Connection>Provider=MSOLAP.3; Data Source=localhost; Initial Catalog=Northwind2; Show Hidden Cubes=True</Connection>
    <Database>Northwind2</Database>
    <KpiName>KPI 0</KpiName>
</Kpi>
```

Data store connection information can be utilized to establish a line of communication between one or more data stores housing data utilized to produce key performances metrics. KPI retrieval information 420 can specify KPI values to return, display captions, as well as other data. For instance:

```
<Column>
    <ID>StructureID</ID>
    <Caption>Display Structure</Caption>
    <Type>KPI_NAME</Type>
</Column>
<Column>
    <ID>ValueID</ID>
    <Caption>Value</Caption>
    <Type>KPI_VALUE</Type>
</Column>
```

Furthermore, it should be appreciated that, inter alia, filters or slices of data can be specified in the retrieval information section to ensure return of KPI values reflecting the health of particular aspects of a business, for example with respect to particular products. Accordingly, the system of the present invention is extremely flexible and customizable.

An exemplary KPI document has been provided herein as Computer Program Listing Appendix A. It should be understood that KPI documents can be written in almost an infinite number of ways in various languages. The provided KPI document is provide herein solely to illustrate one exemplary document for purposes of clarity and understanding. Accordingly, the provided KPI document is not meant to limit the present invention in any manner. KpiDocument is the root node and as such provides information regarding the programming language and the namespace. KpiLines designates a collection of KpiLine nodes. KpiLine can represent either a KPI (e.g., leaf of tree) or a display folder. If KpiLine represents a display folder it doesn't directly contain any KPIs but it can contain other KpiLine nodes. For instance, in the function of a display folder, KpiLine can contain a caption naming the folder, an IsFolder flag signifying if it is a folder or not, and KpiLines. In the function of a KPI, KpiLine can contain a caption, which displays the name of a KPI and KPi nodes including Server providing the host name, Connection providing the connection string, Database supplying the name of the database, and KpiName which provides the server KPI name. Columns are nodes that define the way KPIs should be retrieved and displayed. Column Id provides the unique ID of the column. Caption supplies the column caption, which can be displayed by the client, and Type identifies a predefined type of metric including but not limited to value, goal, status, trend, and weight.

Figure 5:
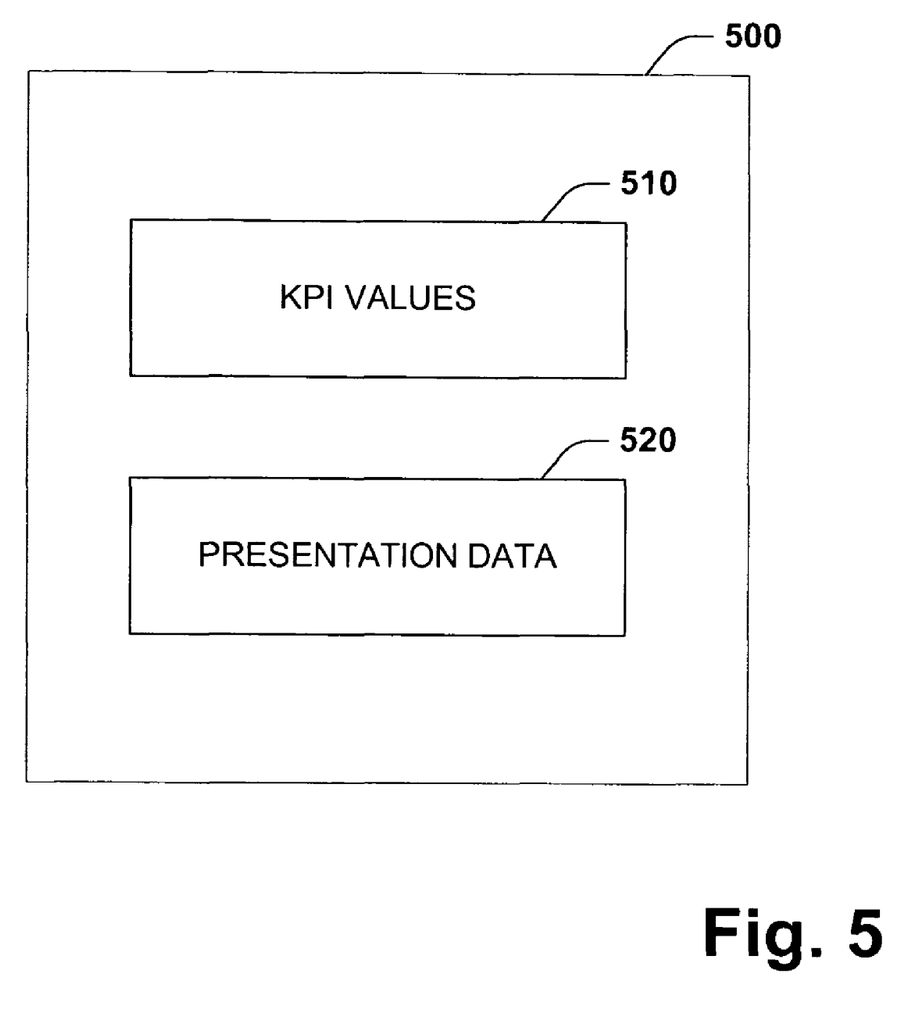
FIG. 5 is a schematic block diagram of a result document component in accordance with an aspect of the present invention.

Turning to FIG. 5, a schematic block diagram of a result document component 500 is depicted in accordance with an aspect of the subject invention. Results document component 500 is produced by a document production component after receiving data from the query component. Results document component 500 comprises KPI values 510 and presentation data 520. KPI values 510 provide the values of each KPI and associated identifier as designated in a KPI document. For example:

```
<Column>
    <ID>ValueID</ID>
    <Value>0</Value>
</Column>
<Column>
    <ID>GoalID</ID>
    <Value>0</Value>
</Column>
```

A results document also includes presentation data to facilitate display of text and/or graphics on a client device. For instance data can describe columns captions, graphical indicators (e.g., arrow, bar, gauge . . . ), as well as the format of the display (e.g., table, nested folders . . . ). For instance:

```
<Column>
    <ID>StatusGraphicID</ID>
    <Value>Gauge - Ascending</Value>
</Column>
<Column>
    <ID>TrendID</ID>
    <Caption>Trend</Caption>
    <Type>KPI_TREND</Type>
</Column>
```

It should also be appreciated that result document component 500 can contain some of the same information as the KPI document to facilitate presentation to a user.

An exemplary results document has been provided herein as Computer Program Listing Appendix B. It should be understood and appreciated that result documents can be generated in almost an infinite number of ways in a plurality of languages. The provided result document is supplied herein solely to illustrate one exemplary document for purposes of clarity and understanding. Accordingly, the provided result document is not meant to limit the present invention in any manner. In the provided XML example, KpiResultDocument is the root node. KpiLines are a collection of KpiLine nodes. Each KpiLine can represent either a KPI (e.g., leaf of tree) or a display folder. If the KpiLine represents a display folder then the KpiLine can contain a caption specifying the display folder name, an IsFolder node that acts as flag to signify it is a folder or not, and an empty node called Columns. If the KpiLine represents a KPI then the KpiLine can contain a caption node containing the name of the KPI to be displayed and a Columns node, which is actually a collection of other nodes. The Columns node can contain an ID node to uniquely identify a column (e.g., form the KpiDocument) as well as a Value node that specifies the KPI value for the particular column. Furthermore, the results document can contain column nodes exactly the same or similar to those in the KpiDocument. For example, a Columns node can include an ID to uniquely identify the column, a Caption node specifying the column caption which will be displayed by a client, and a type identifying predefined types of metrics including but not limited to goal, trend, and status.

Figure 6:
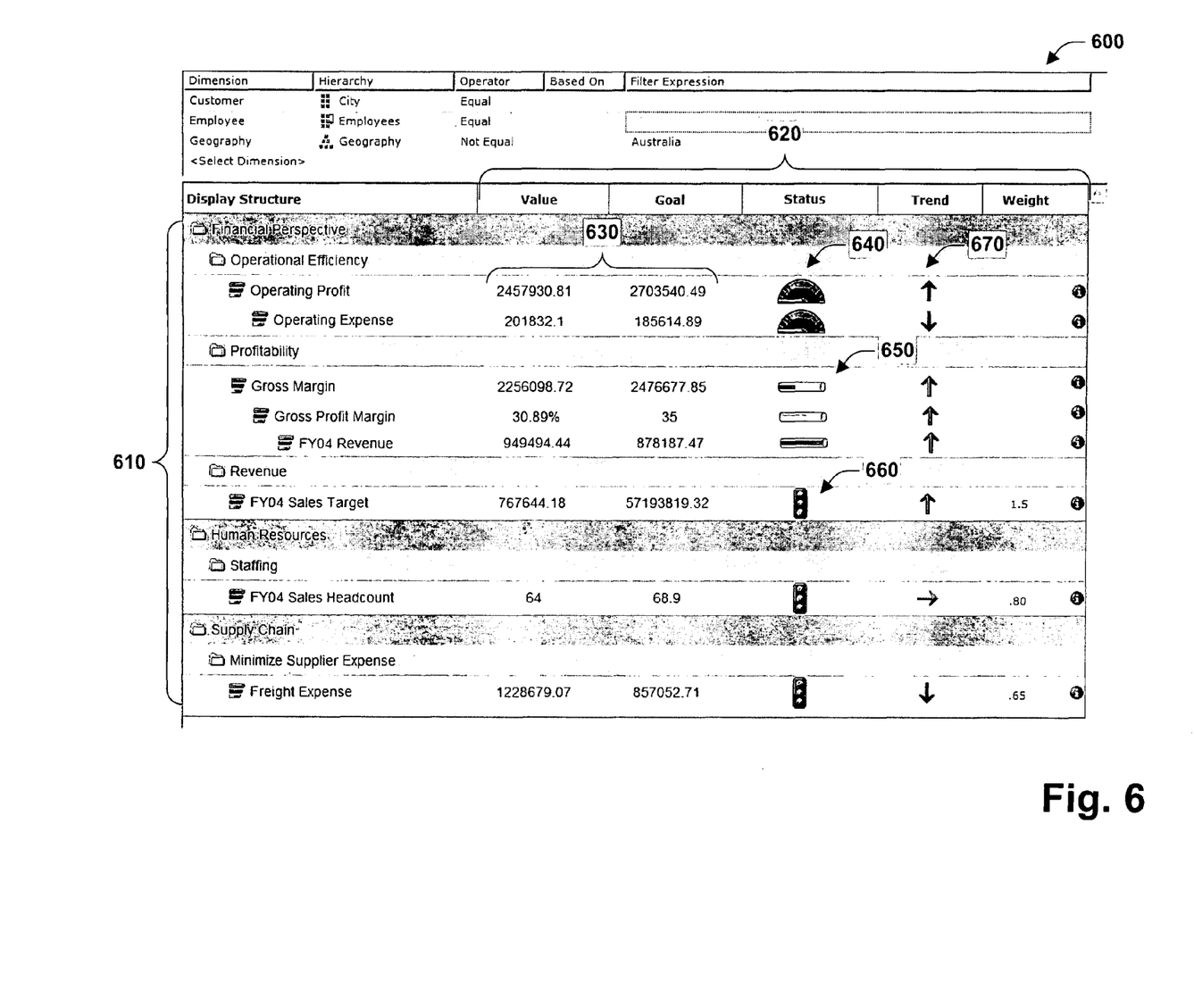
FIG. 6 illustrates an exemplary graphical user interface in accordance with an aspect of the subject invention.

Once the results document component is produced it can be transmitted to the user interface component 110 (FIG. 1). The interface component 110 can then utilize the information provided by the results document to generate a display of the particular information. As it is known in the art graphical interfaces can be organized in an almost infinite number of ways. For example, an interface can employ text, graphical icons, or text and graphics. The goal of any interface is to organize and convey data to clients in a manner that is easy to understand and utilize. Turning to FIG. 6, an exemplary graphical user interface (GUI) 600 is depicted in accordance with an aspect of the subject invention. GUI 600 includes a myriad of different KPIs names 610. KPIs names 610 are grouped into folders so as to provide and organized and easily interpretable display. Each KPI name 610 is associated with a plurality of metrics 620 including value, goal, status, trend, and weight. Value and goal are represented as numeric values 630, here in dollars. Status can be represented in a plurality of different manners that indicate progression toward a goal. In the present GUI 600, gauges 640, bars 650, and stop light 660 are utilized. Gauges 640 can illustrate status moving the hands on the gauge relative to some markers thereon. Bars 650 can be utilized by extending the bars as values come closer to the specified goal. Furthermore, stop lights can be utilized to indicate status such that in a for a sales KPI green signifies that the goal as been accomplished, yellow indicates the goal is close, and red signifies that values are distant from the goal. The trend metric can employ arrows 670 to indicate the current trend. Weight metric can be display with a graphic and or together with numerical weight value.

Figure 7:
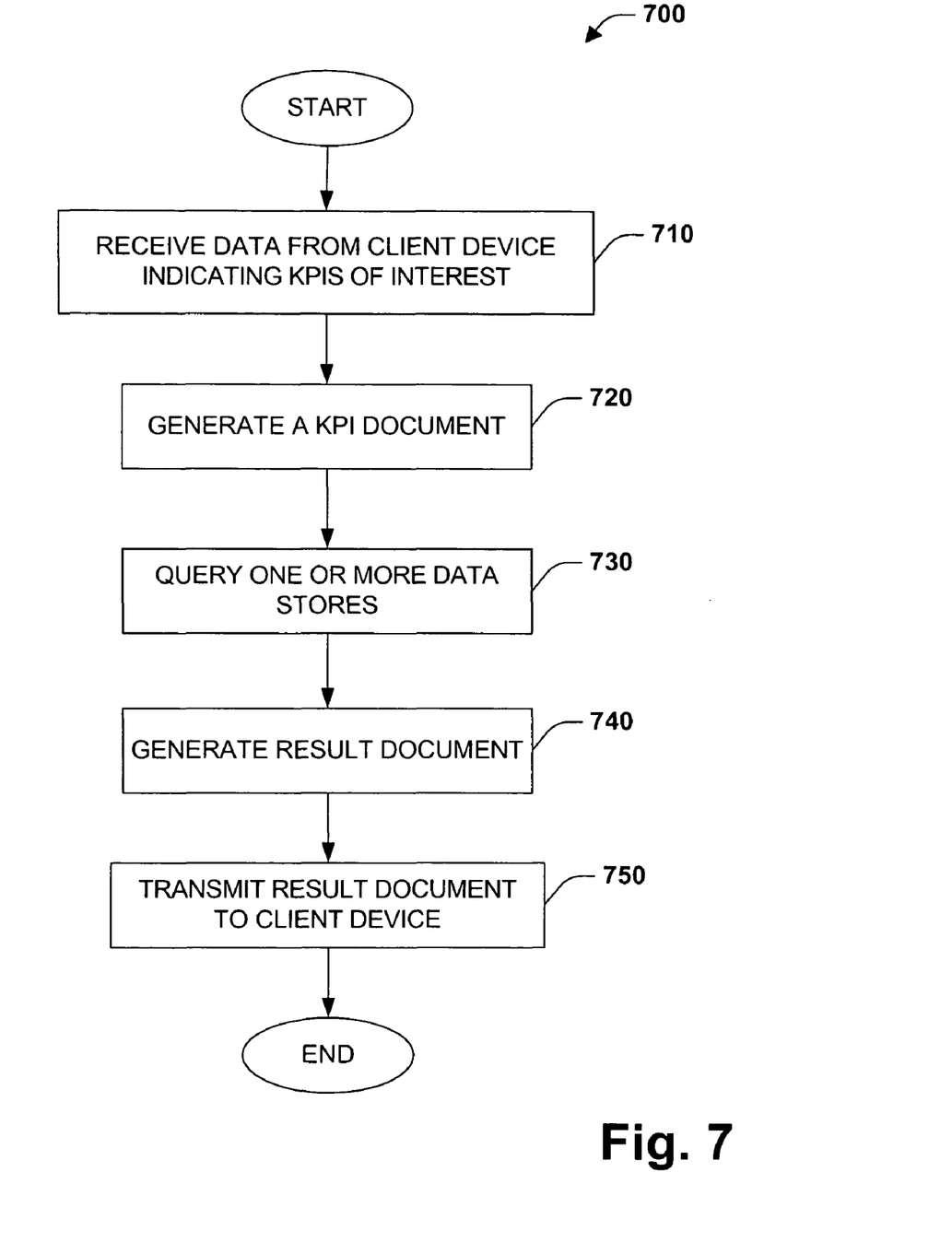
FIG. 7 is a flow chart diagram of a method for retrieving performance indicators in accordance with an aspect of the present invention.
Figure 8:
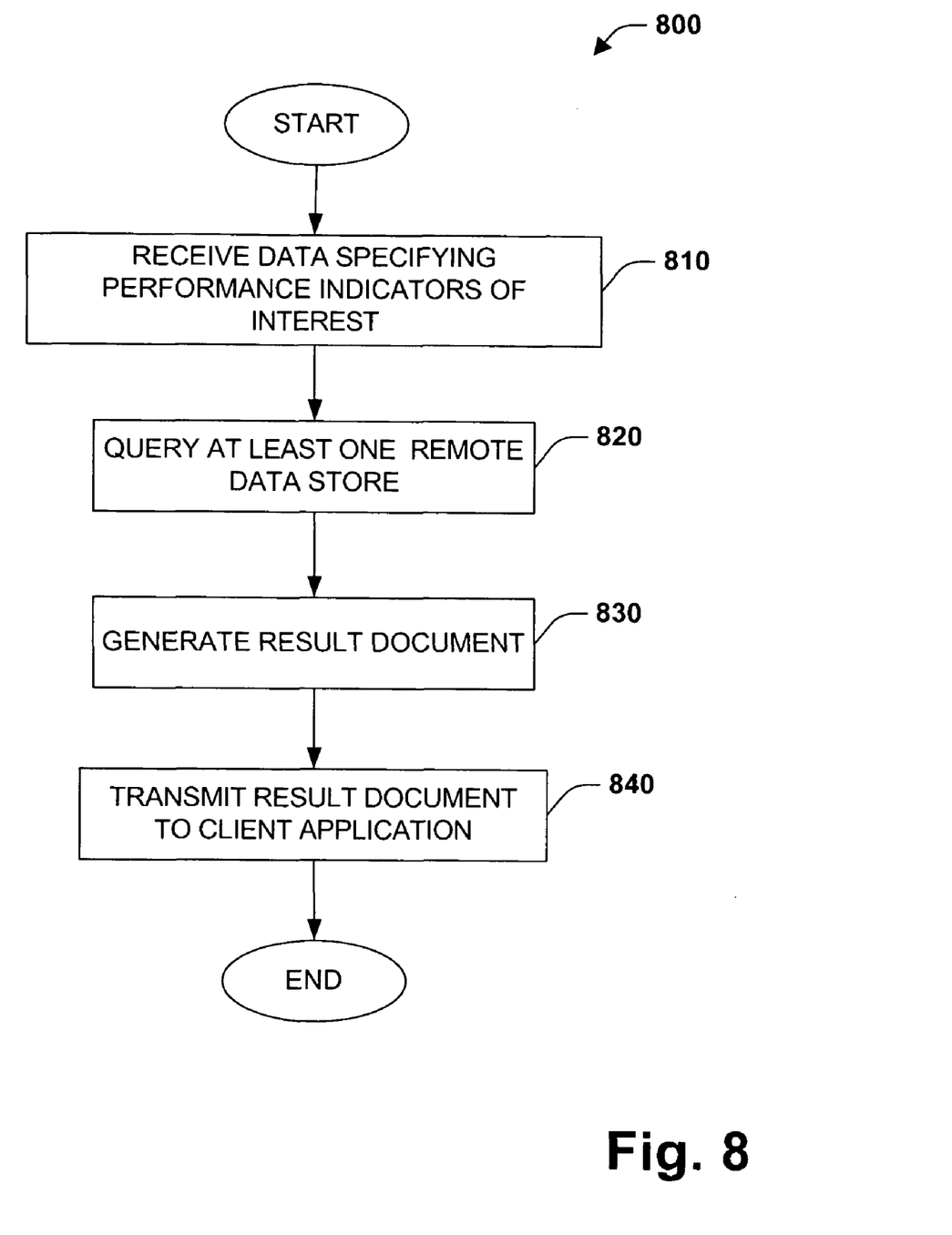
FIG. 8 is flow chart diagram of a performance metric methodology in accordance with an aspect of the subject invention.

In view of the exemplary system(s) described supra, a methodology that may be implemented in accordance with the present invention will be better appreciated with reference to the flow charts of FIGS. 7-8. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

FIG. 7 depicts a method of retrieving key performance indicators in accordance with an aspect of the subject invention. At 710, data is received from a client device specifying key performance indicators (KPIs) of interest. A client device can be any electronic computing device including but not limited to computers, mobile phones, pagers, personal digital assistants (PDAs), set-top boxes, and smart watches. A user of a client device can specify KPIs of interest by utilizing an interface such as a graphical user interface (GUI). KPIs of interest can be any indicator that quantitatively captures the health of a business, for example. At 720, the data received from the client device can be utilized to generate a KPI document. The KPI document can be a listing of KPIs and associated metrics. Furthermore, the KPI document can include information such as data source contact information as well as KPI retrieval information. According to an aspect of the present invention the KPI document can be generated utilizing a component residing on a remote computer or server, rather than a client device. The KPI document can be utilized to query one or more data stores at 730. For example, the KPI document can be employed to retrieve expressions from a data store, which can be used by a query component to retrieve KPIs (e.g., column metrics/graphics associated with a selected objective). Data stores can include relational databases, multidimensional OLAP databases, and the like. At 740, a result document can be generated containing data resulting from one or more queries, such as KPI values and graphic information (e.g., gauge, arrow, stop light for particular KPI column). Of course, the result document can contain other information and data, for instance data specifying the format of KPI display (e.g., table, nested folders . . . ). According to another aspect of the invention, it should be appreciated that the result document can be encoded utilizing XML, however other encoding schemas can be utilized. Finally, at 750 the result document can be transmitted to the requesting client device, for example for display to a user via a graphical user interface.

FIG. 8 illustrates a performance indicator metric methodology in accordance with an aspect of the present invention. At 810, the data is received or retrieved regarding performance indicators of interest. According to as aspect of the invention, the data regarding performance indicators can be provided in a KPI document, for instance generated by a user client device or application. At 820, one or more remote data stores or databases can be queried utilizing the information provided in a KPI document for example. The database can be a relational database, a multidimensional OLAP database or the like. Furthermore, the databases can contain data indicating expressions to be executed to generate correct metric data. Accordingly, queries can be specified by simply referencing known KPIs. The database can then map to the appropriate expressions, execute them, and return data. At 830, a result document can be generated comprising at least the query results. The result document can also include such things as information identifying graphics to be displayed in particular KPI columns (e.g., gauge, arrow, stop light . . . ). After generation, the result document can be transmitted or transferred to a client device or application. The client device can then display the requested KPIs to a requesting user. According to an aspect of the present invention the result document can be an XML file. Hence, upon transfer to a client device or application the result file can be displayed via an extensible style sheet language (XSL). However, it is to be appreciated that the result document can be generated in any format that can be transferred and thereafter interpreted by a client device or application.

Figure 9:
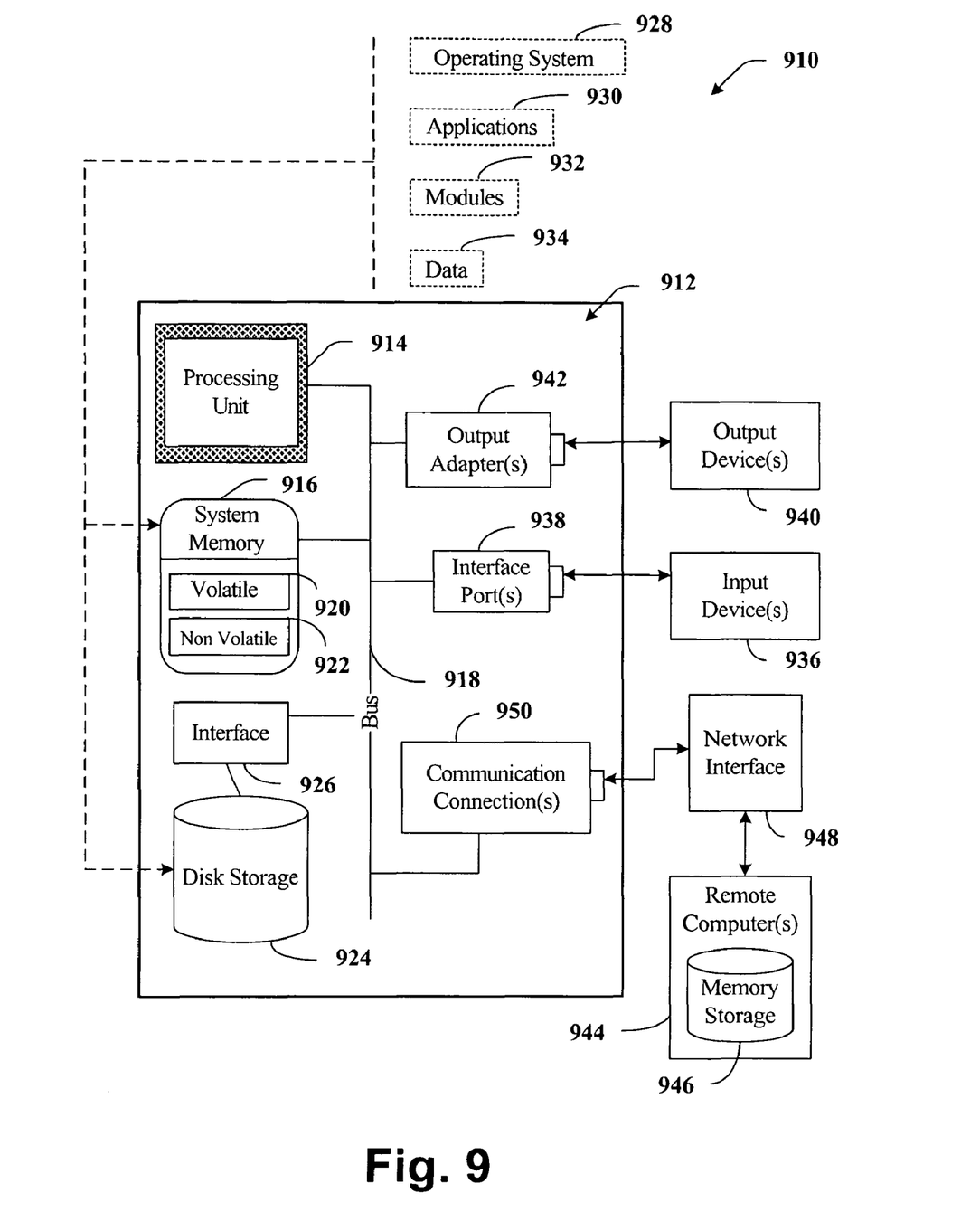
FIG. 9 is a schematic block diagram illustrating a suitable operating environment in accordance with an aspect of the present invention.
Figure 10:
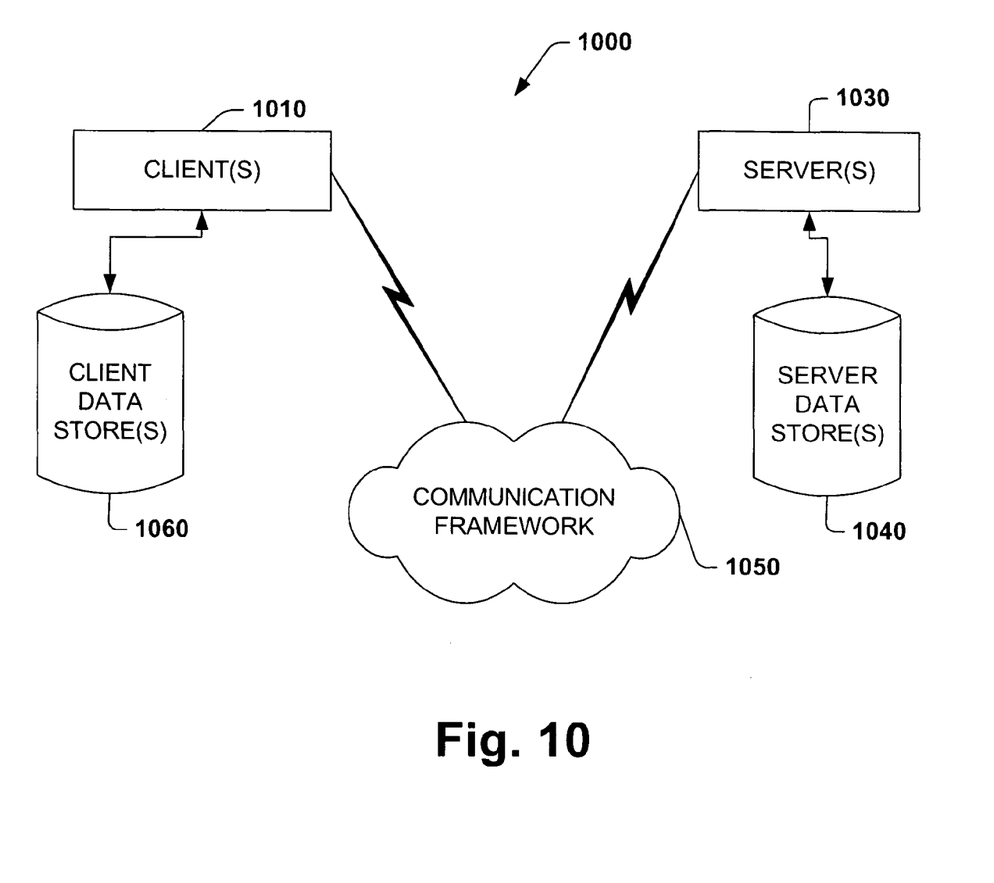
FIG. 10 is a schematic block diagram of a sample-computing environment with which the present invention can interact.

In order to provide a context for the various aspects of the invention, FIGS. 9 and 10 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. which perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example disk storage 924. Disk storage 4124 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. Furthermore, it is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, touch screen, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/ software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems, DSL modems, power modems, ISDN adapters, and Ethernet cards.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes or having" is used in either the detailed description or the claims, such term is intended to be inclusive in a manner similar to the term "comprising" as "comprising" is interpreted when employed as a transitional word in a claim.

COMPUTER PROGRAM LISTING APPENDIX A

```
KpiDocument xmlns:xsd="http://www.w3.org/2001/XMLSchema"
    xmlns:xsi="http://www.w3.org/2001/XMLSchema-instance">
    <KpiLines>
        <KpiLine>
            <Caption>Profit</Caption>
            <IsFolder>false</IsFolder>
            <Filters />
            <Kpi>
                <Server>localhost</Server>
                <Connection>Provider=MSOLAP.3;Data
                Source=localhost;Initial
                Catalog=Northwind2;Show Hidden
                Cubes=True</Connection>
                <Database>Northwind2</Database>
                <KpiName>KPI 0</KpiName>
            </Kpi>
            <KpiLines />
        </KpiLine>
        <KpiLine>
            <Caption>This is a folder</Caption>
            <IsFolder>true</IsFolder>
            <Filters />
            <KpiLines>
                <KpiLine>
                    <Caption>Growth</Caption>
                    <IsFolder>false</IsFolder>
                    <Filters />
```

```
                <Kpi>
                    <Server>localhost</Server>
                    <Connection>Provider=MSOLAP.3;Data
                        Source=localhost;Initial
                        Catalog=Northwind2;Show
                        Hidden Cubes=True</Connection>
                    <Database>Northwind2</Database>
                    <KpiName>KPI 1</KpiName>
                </Kpi>
                <KpiLines />
            </KpiLine>
        </KpiLines>
    </KpiLine>
</KpiLines>
<Columns>
    <Column>
        <ID>StructureID</ID>
        <Caption>Display Structure</Caption>
        <Type>KPI_NAME</Type>
    </Column>
    <Column>
        <ID>ValueID</ID>
        <Caption>Value</Caption>
        <Type>KPI_VALUE</Type>
    </Column>
    <Column>
        <ID>GoalID</ID>
        <Caption>Goal</Caption>
        <Type>KPI_GOAL</Type>
    </Column>
    <Column>
        <ID>StatusID</ID>
        <Caption>Status</Caption>
        <Type>KPI_STATUS</Type>
    </Column>
    <Column>
        <ID>StatusGraphicID</ID>
        <Caption>Status Graphic</Caption>
        <Type>KPI_STATUS_GRAPHIC</Type>
    </Column>
    <Column>
        <ID>TrendID</ID>
        <Caption>Trend</Caption>
        <Type>KPI_TREND</Type>
    </Column>
    <Column>
        <ID>TrendGraphicID</ID>
        <Caption>Trend Graphic</Caption>
        <Type>KPI_TREND_GRAPHIC</Type>
    </Column>
    <Column>
        <ID>WeightID</ID>
        <Caption>Weight</Caption>
        <Type>KPI_WEIGHT</Type>
    </Column>
    <Column>
        <ID>DescriptionID</ID>
        <Caption>Description</Caption>
        <Type>KPI_DESCRIPTION</Type>
    </Column>
</Columns>
</KpiDocument>
```

COMPUTER PROGRAM LISTING APPENDIX B

```
KpiResultDocument xmlns:xsd="http://www.w3.org/2001/XMLSchema"
    xmlns:xsi="http://www.w3.org/2001/XMLSchema-instance">
    <KpiLines>
        <KpiLine>
            <Caption>Profit</Caption>
            <IsFolder>false</IsFolder>
            <Columns>
                <Column>
                    <ID>StructureID</ID>
                    <Value>KPI 0</Value>
                </Column>
                <Column>
                    <ID>ValueID</ID>
                    <Value>0</Value>
                </Column>
                <Column>
                    <ID>GoalID</ID>
                    <Value>0</Value>
                </Column>
                <Column>
                    <ID>StatusID</ID>
                    <Value>0</Value>
                </Column>
                <Column>
                    <ID>StatusGraphicID</ID>
                    <Value>Gauge - Ascending</Value>
                </Column>
                <Column>
                    <ID>TrendID</ID>
                    <Value>0</Value>
                </Column>
                <Column>
                    <ID>TrendGraphicID</ID>
                    <Value>Standard Arrow</Value>
                </Column>
                <Column>
                    <ID>WeightID</ID>
                </Column>
                <Column>
                    <ID>DescriptionID</ID>
                </Column>
            </Columns>
            <KpiLines />
        </KpiLine>
        <KpiLine>
            <Caption>This is a folder</Caption>
            <IsFolder>true</IsFolder>
            <Columns />
            <KpiLines>
                <KpiLine>
                    <Caption>Growth</Caption>
                    <IsFolder>false</IsFolder>
                    <Columns>
                        <Column>
                            <ID>StructureID</ID>
                            <Value>KPI</Value>
                        </Column>
                        <Column>
                            <ID>ValueID</ID>
                            <Value>1</Value>
                        </Column>
                        <Column>
                            <ID>GoalID</ID>
                            <Value>1</Value>
                        </Column>
                        <Column>
                            <ID>StatusID</ID>
                            <Value>0</Value>
                        </Column>
                        <Column>
                            <ID>StatusGraphicID</ID>
                            <Value>Gauge - Ascending</Value>
                        </Column>
                        <Column>
                            <ID>TrendID</ID>
                            <Value>0</Value>
                        </Column>
                        <Column>
                            <ID>TrendGraphicID</ID>
                            <Value>Standard Arrow</Value>
                        </Column>
                        <Column>
                            <ID>WeightID</ID>
                        </Column>
                        <Column>
                            <ID>DescriptionID</ID>
                        </Column>
```

-continued

```
        </Columns>
        <KpiLines />
      </KpiLine>
    </KpiLines>
  </KpiLine>
</KpiLines>
<Columns>
  <Column>
    <ID>StructureID</ID>
    <Caption>Display Structure</Caption>
    <Type>KPI_NAME</Type>
  </Column>
  <Column>
    <ID>ValueID</ID>
    <Caption>Value</Caption>
    <Type>KPI_VALUE</Type>
  </Column>
  <Column>
    <ID>GoalID</ID>
    <Caption>Goal</Caption>
    <Type>KPI_GOAL</Type>
  </Column>
  <Column>
    <ID>StatusID</ID>
    <Caption>Status</Caption>
    <Type>KPI_STATUS</Type>
  </Column>
  <Column>
    <ID>StatusGraphicID</ID>
    <Caption>Status Graphic</Caption>
    <Type>KPI_STATUS_GRAPHIC</Type>
  </Column>
  <Column>
    <ID>TrendID</ID>
    <Caption>Trend</Caption>
    <Type>KPI_TREND</Type>
  </Column>
  <Column>
    <ID>TrendGraphicID</ID>
    <Caption>Trend Graphic</Caption>
    <Type>KPI_TREND_GRAPHIC</Type>
  </Column>
  <Column>
    <ID>WeightID</ID>
    <Caption>Weight</Caption>
    <Type>KPI_WEIGHT</Type>
  </Column>
  <Column>
    <ID>DescriptionID</ID>
    <Caption>Description</Caption>
    <Type>KPI_DESCRIPTION</Type>
  </Column>
</Columns>
</KpiResultDocument>
```

What is claimed is:

1. A key performance indicator (KPI) system implemented by computer, having a processor, comprising:
a client device user interface component;
a processor component that receives KPI identification information from the interface component for one or more KPIs and generates a KPI document, wherein the KPI document identifies the one or more KPIs to be retrieved based upon the KPI identification information received from the interface component and information identifying how to retrieve each of the one or more KPIs, the KPI document including text and graphical display parameters for each of the one or more KPIs and which correspond to a value, a goal, a status, a trend and a weight for each of the one or more KPIs; and
a query component that employs the KPI document to retrieve KPI information from one or more data stores, generate a result document, and transfer the result document back to the interface component, the result document specifying presentation data regarding KPI graphics and values to be used by the user interface component in displaying the corresponding value, goal, status, trend and weight for each of the one or more KPIs in a user interface,
the user interface component using the result document to generate a user interface display, that separately displays each of the one or more KPIs along with a simultaneous representation of the text and graphical display parameters, including at least the value, the goal, the status, the trend and the weight of each of the corresponding one or more KPIs,
wherein the processor component, query component and user interface component are executed by processor.

2. The system of claim 1, wherein the KPI document comprises database name, connection string, and KPI name for each KPI.

3. The system of claim 1, wherein the KPI retrieval Information includes a filter component specifying a subset of data to be utilized to generate a KPI metric.

4. The system of claim 1, wherein the KPI document is encoded as an XML document.

5. The system of claim 1, wherein the result document includes KPI values and information regarding KPI graphics.

6. The system of claim 5, wherein the result document is an XML document.

7. The system of claim 1, wherein the processor component is executed by a computer or server remotely located from the client device.

8. The system of claim 7, wherein the client device is one of a mobile phone and a personal digital assistant.

9. The system of claim 1, wherein the data store is a relational database.

10. The system of claim 1, wherein the data store is a multidimensional OLAP database.

11. A method implemented by a computer having a processor for retrieving key performance indicators (KPIs) comprising:
The computer receiving data from a client device specifying KPIs of interest;
The computer generating a KPI document from the received data, wherein the KPI document defines for each KPI: a KPI name, one or more query expressions for retrieving the KPI, a database to query, and display definition for the KPI, the display definition including text and graphical display parameters which correspond to a value, a goal, a status, a trend and a weight for the KPI;
The computer querying one or more data stores utilizing data provided in the KPI document; and the computer generating a result document from the query results, the results document specifying presentation data regarding KPI graphics and values to be used by a user interface component in displaying the corresponding value, goal, status, trend and weight for each of the KPIs of interest,
the user interface component using the result document to generate a user interface display that separately displays each of the one or more of the KPIs of interest along with a simultaneous representation of the text and graphical display parameters, including at least the value, the goal, the status, the trend and the weight of each of the corresponding displayed one or more KPIs.

12. The method of claim 11, further comprising retrieving query expressions from a data store and utilizing the query expressions to query the data store for one or more KPIs.

13. The method of claim 11, wherein the KPI document comprises a list of KPIs in an XML format.

14. The method of claim 11, wherein the KPI document comprises data concerning data store connections and KPI retrieval information.

15. The method of claim 11, wherein the KPI document is generated by a component remote from the client device.

16. The method of claim 15, wherein the component that generates the KPI component is executed by a server.

17. The method of claim 11, wherein the result document comprises KPI values specified in an XML format.

18. The method of claim 11, further comprising transferring the result document to the client device.

19. The method of claim 11, wherein the status of at least one KPI is represented as a gauge on which hands on the gauge move relative to markers on the gauge.

20. The method of claim 11, wherein the status of at least one KPI is represented as a status bar.

21. The method of claim 11, wherein the status of at least one KPI is represented as a stop light on which green signifies that the goal has been accomplished, and on which yellow and red signify that the goal has not been accomplished.

22. The method of claim 11, wherein the user interface component displays rows and columns in which each of the one or more KPIs of interest correspond with at least one row, and in which the simultaneous representation of the text and graphical display parameters comprise a plurality of columns corresponding to the value, the goal, the status, the trend and the weight.

23. The method of claim 11, wherein the KPI document includes a plurality of entries including at least one folder entry comprising a caption naming the folder, and at least one KPI entry corresponding to the folder and including the KPI name, and wherein the result document includes a plurality of entries including at least entries corresponding to the folder entry and the KPI entry.

24. The method of claim 23, wherein the user interface component displays rows and columns in which a first row corresponds the folder entry, the first row displaying the caption, and in which a second row corresponds to the KPI entry, the second row immediately below the first row and displaying the KPI name along with the simultaneous representation of the text and graphical display parameters as a plurality of columns corresponding to the value, the goal, the status, the trend and the weight.

25. A computer readable storage medium having stored thereon computer executable instructions which, when executed by a processor of a computing system, implement a method comprising:

receiving data from a client device specifying KPIs of interest; generating a KPI document from the received data, wherein the KPI document defines for each KPI: a KPI name, one or more query expressions for retrieving the KPI, a database to query, and display definition for the KPI, the display definition including text and graphical display parameters which correspond to a value, a goal, a status, a trend and a weight for the KPI;

querying one or more data stores utilizing data provided in the KPI document;

and generating a result document from the query results, the results document specifying presentation data regarding KPI graphics and values to be used by a user interface component in displaying the corresponding value, goal, status, trend and weight for each of the KPIs of interest, the user interface component using the result document to generate a user interface display that separately displays each of the one or more of the KPIs of interest along with a simultaneous representation of the text and graphical display parameters, including at least the value, the goal, the status, the trend and the weight of each of the corresponding displayed one or more KPIs.

* * * * *